(12) United States Patent
Holmes et al.

(10) Patent No.: US 7,470,209 B2
(45) Date of Patent: Dec. 30, 2008

(54) HYBRID POWERTRAIN HAVING AN ELECTRICALLY VARIABLE TRANSMISSION AND ENGINE VALVE CONTROL

(75) Inventors: Alan G. Holmes, Clarkston, MI (US);
Michael R. Schmidt, Carmel, IN (US);
Donald Klemen, Carmel, IN (US);
Anthony H. Heap, Ann Arbor, MI (US);
Gregory A. Hubbard, Brighton, MI (US); Larry T. Nitz, South Lyon, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 141 days.

(21) Appl. No.: 11/286,709

(22) Filed: Nov. 23, 2005

(65) Prior Publication Data

US 2007/0142152 A1    Jun. 21, 2007

(51) Int. Cl.
*B60K 1/02* (2006.01)

(52) U.S. Cl. ............... 477/3; 477/107; 475/5; 475/275; 475/282; 180/65.2

(58) Field of Classification Search ............... 180/65.2; 475/5, 275, 277, 282, 149; 477/3, 109, 118, 477/107
See application file for complete search history.

(56) References Cited

U.S. PATENT DOCUMENTS

| 5,009,301 | A | 4/1991 | Spitler | 192/106.2 |
|---|---|---|---|---|
| 5,558,589 | A | 9/1996 | Schmidt | 475/5 |
| 5,931,757 | A | 8/1999 | Schmidt | 475/2 |
| 6,557,518 | B1 | 5/2003 | Albertson et al. | 123/198 F |
| 6,584,942 | B1 | 7/2003 | Albertson et al. | 123/90.16 |
| 6,584,951 | B1 | 7/2003 | Patel et al. | 123/198 F |
| 6,600,980 | B1 * | 7/2003 | Kraska et al. | 701/22 |
| 6,637,387 | B1 | 10/2003 | Gecim et al. | 123/90.16 |
| 6,953,409 | B2 * | 10/2005 | Schmidt et al. | 475/5 |
| 2005/0209045 | A1 * | 9/2005 | Lewis | 477/107 |
| 2005/0257967 | A1 * | 11/2005 | Vahabzadeh et al. | 180/65.2 |
| 2006/0128513 | A1 * | 6/2006 | Tata et al. | 475/5 |
| 2006/0174624 | A1 * | 8/2006 | Grabowski et al. | 180/65.2 |

* cited by examiner

*Primary Examiner*—David D Le
*Assistant Examiner*—Derek D Knight (57) ABSTRACT

A hybrid powertrain includes an electrically variable transmission and an internal combustion engine. The transmission is operable to provide a continuously variable mode of operation. The engine is capable of variable displacement in that at least half of the cylinders contained therein are deactivatable. Additionally the internal combustion engine operates with a late intake valve closing strategy to increase the peak efficiency of the internal combustion engine.

15 Claims, 2 Drawing Sheets

FIG. 3

HYBRID POWERTRAIN HAVING AN ELECTRICALLY VARIABLE TRANSMISSION AND ENGINE VALVE CONTROL

TECHNICAL FIELD

The present invention relates to a hybrid powertrains and more specifically to hybrid powertrains having an electrically variable transmission selectively connected to an internal combustion engine having a plurality of selectively deactivatable intake and exhaust valves and a late intake valve closing method of operation.

BACKGROUND OF THE INVENTION

The purpose of a vehicular transmission is to provide a neutral, at least one reverse and one or more forward driving ranges that impart power from an engine, and/or other power sources, to the drive members which deliver the tractive effort from the vehicle to the terrain over which the vehicle is being driven. As such, the drive members may be front wheels, rear wheels or a track, as required to provide the desired performance.

A series propulsion system is a system in which energy follows a path from an engine to an electric storage device and then to an electrical motor which applies power to rotate the drive members. There is no direct mechanical connection between the engine and the drive members in a series propulsion system.

Transmissions adapted to receive the output power from either an engine or an electric motor, or both, have heretofore relied largely on what has been designated as series, hybrid propulsion systems. Such systems are designed with auxiliary power units (APU's) of relatively low power for minimum emissions and best fuel economy. However, such combinations of small APU's and even large energy storage devices do not accommodate high-average power vehicles or address duty cycles that demand continuous, constant speed operation. Steep grades and sustained high-average cruising speeds at desired high efficiencies are not achievable with a typical, series, hybrid transmission configuration.

The challenge, therefore, is to provide a power system that will operate at high efficiencies over a wide variety of operating conditions. Desirable electric variable transmissions should leverage the benefits of a series, hybrid transmission for desirable low-average power duty cycles—i.e.: low speed start/stop duty cycles—as well as the benefits of a parallel hybrid transmission for high-average output power, high speed duty cycles. In a parallel arrangement the power supplied by the engine and the power supplied by the source of electrical energy are independently connected to the drive members.

Moreover, perfecting a concept wherein two modes, or two integrated power split gear trains, with either mode available for synchronous selection by the on-board computer to transmit power from the engine and/or the motor/generator to the output shaft results in a hybrid transmission having an extremely wide range of applications.

The desired beneficial results may be accomplished by the use of a variable, two-mode, input and compound split, parallel hybrid electromechanical transmission. Such a transmission utilizes an input member to receive power from the vehicle engine and a power output member to deliver power to drive the vehicle. First and second motor/generator power controllers are connected to an energy storage device, such as a batter pack, so that the energy storage devices can accept power from, and supply power to, the first and second motor/generators. A control unit regulates power flow among the energy storage devices and the motor/generators as well as between the first and second motor/generators.

A variable, two-mode, input-split, parallel, hybrid electro-mechanical transmission also employs at least one planetary gear set. The planetary gear set has an inner gear member and an outer gear member, each of which meshingly engages a plurality of planet gear members. The input member is operatively connected to one of the gear members in the planetary gear set, and means are provided operatively to connect the power output member to another of the gear members in the planetary gear set. One of the motor/generators is connected to the remaining gear member in the planetary gear set, and means are provided operatively to connect the other motor/generator to the output shaft.

Operation in the first or second mode may be selectively achieved by using torque-transmitting mechanisms. Heretofore, in one mode the output speed of the transmission is generally proportional to the speed of one motor/generator, and in the second mode the output speed of the transmission is generally proportional to the speed of both motor/generators.

In some embodiments of the variable, two-mode, input-split, parallel, hybrid electro-mechanical transmission, a second planetary gear set is employed. In addition, some embodiments may utilize three torque-transmitting mechanisms—two to select the operational mode desired of the transmission and the third selectively to disconnect the transmission from the engine. In other embodiments, all three torque-transmitting mechanisms may be utilized to select the desired operational mode of the transmission.

As those skilled in the art will appreciate, a transmission system using a power split arrangement will receive power from two sources. Utilization of one or more planetary gear sets permits two or more gear trains, or modes, by which to deliver power from the input member of the transmission to the output member thereof.

U.S. Pat. No. 5,558,589 which issued on Sep. 24, 1996, to General Motors Corporation, as is hereby incorporated by reference, teaches a variable, two-mode, input-split, parallel, hybrid electromechanical transmission wherein a "mechanical point" exists in the first mode and two mechanical points exist in the second mode. U.S. Pat. No. 5,931,757 which issued on Aug. 3, 1999 to General Motors Corporation, and is hereby incorporated by reference, teaches a two-mode, compound-split, electro-mechanical transmission with one mechanical point in the first mode and two mechanical points in the second mode.

A mechanical point occurs when either of the motor/generators is stationary at any time during operation of the transmission in either the first or second mode. The lack of a mechanical point is a drawback inasmuch as the maximum mechanical efficiency in the transfer of power from the engine to the output occurs when one of the motor/generators is at a mechanical point—i.e.: stationary. In variable, two-mode, input-split, parallel, hybrid electromechanical transmissions, however, there is typically one point in the second mode at which one of the motor/generators is not rotating such that all the engine power is transferred mechanically to the output.

Additional increases in powertrain operating efficiencies may be achieved by providing a variable displacement internal combustion engine, which operates on the principle of cylinder deactivation. During operating conditions that require high output torque, every cylinder of a variable displacement engine is supplied with fuel and air such that the engine can sustain combustion and provide torque. During operating conditions at low speed, low load, and/or other inefficient conditions for a fully displaced engine, cylinders may be deactivated to improve efficiencies of the variable displacement engine. For example, in the operation of a vehicle equipped with a four-cylinder variable displacement engine, fuel economy will be improved if the engine is operated with only two cylinders during relatively low torque operating conditions by reducing throttling losses. Throttling losses, also known as pumping losses, are the extra work that the engine must perform to pump air from the relatively low pressure of an intake manifold, across intake and exhaust valves, and out to the atmosphere. The cylinders that are deactivated will disallow airflow through their respective intake and exhaust valves, thereby reducing pumping losses by forcing the internal combustion engine to operate at a higher intake manifold pressure. Since the deactivated cylinders do not allow air to flow, additional losses are avoided by operating the deactivated cylinders as "air springs"due to the compression and decompression of the air retained in each deactivated cylinder.

SUMMARY OF THE INVENTION

Provided is a hybrid powertrain having a transmission with at least one motor and at least one differential gear set contained therein. The motor and differential gear set are selectively operable to operate the transmission in an electrically variable mode of operation. Also provided is an internal combustion engine having a plurality of cylinders each of which has at least one intake valve and at least one exhaust valve provided in relation thereto. Additionally, a corresponding number of pistons are provided, each being reciprocally disposed within a respective one of the plurality of cylinders. Each of the plurality of pistons has an intake stroke, compression stroke, expansion stroke, and exhaust stroke. The at least one intake valve and the at least one exhaust valve corresponding to at least half of the plurality of cylinders are selectively deactivatable. At least one valve actuation mechanism is operable to selectively open and close a respective one of the at least one intake valve. The valve actuation mechanism operates to hold a respective intake valve substantially open during a portion of the compression stroke.

The hybrid powertrain may further include an accessory and the internal combustion engine may further include a crankshaft. The crankshaft is connected to an input shaft of the transmission and the accessory is substantially driven by the crankshaft. Additionally, the intake valves and the exhaust valves corresponding to each of the plurality of cylinders may be selectively deactivatable such that the at least one motor of the transmission operates to turn the crankshaft and drive the accessory with a minimum of pumping losses. The hybrid powertrain may include an electrical storage device operable to selectively provide power to the at least one motor. The hybrid powertrain may also include at least one pre-progammable electronic control unit operable to control the transmission and the internal combustion engine. The hybrid powertrain may further include at least one torque transmitting device operable to selectively lock a respective one of the at least one differential gear set to enable at least one fixed ratio within the transmission.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
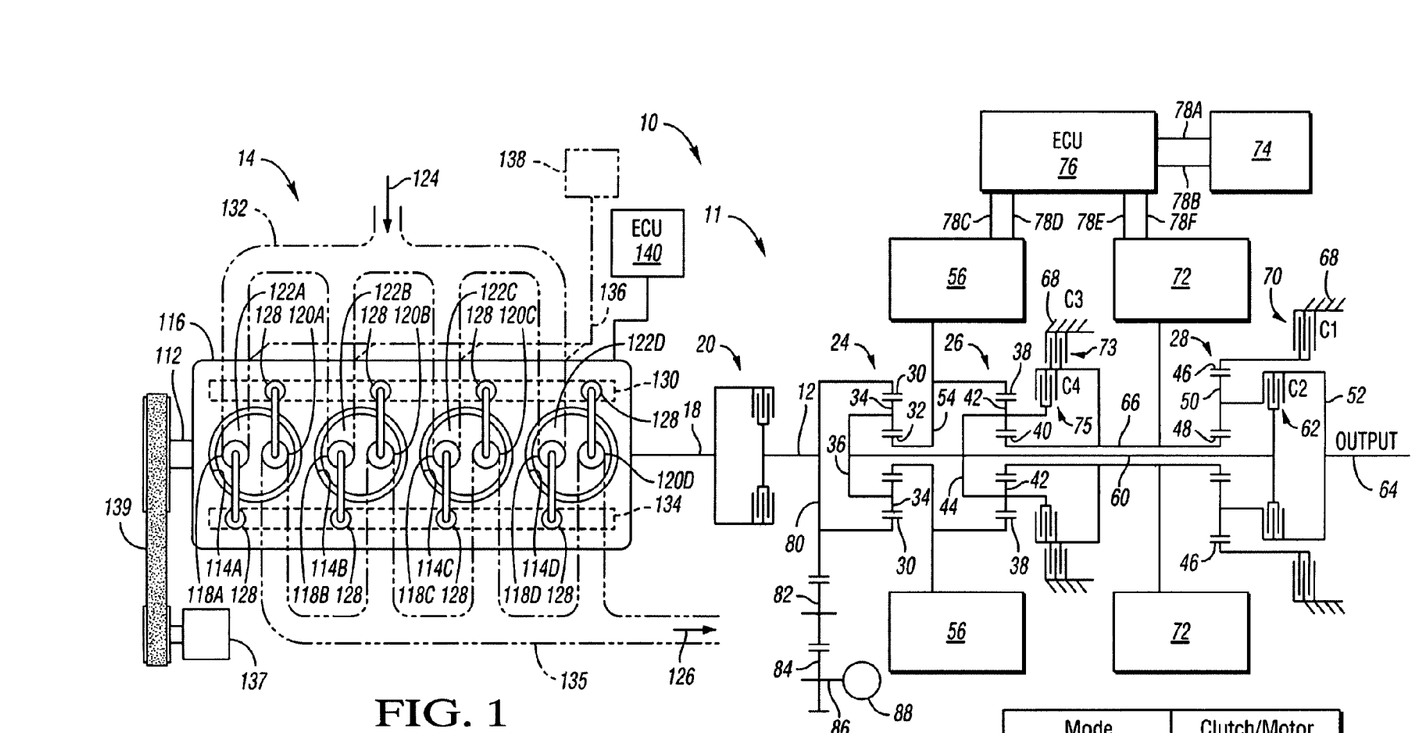
FIG. 1 is a schematic representation of a vehicular powertrain having a two-mode, compound-split, electromechanical transmission connected to an internal combustion engine employing cylinder deactivation and late intake valve closing illustrating the concepts of the present invention.

Referring to FIG. 1, there is shown a hybrid powertrain 10 having a two-mode, compound-split, electromechanical transmission 11 mounted with respect to an engine 14. The transmission 11 has an input member 12 that may be in the nature of a shaft which may be directly driven by the engine 14. A transient torque damper may be incorporated between the output shaft 18 of the engine 14 and the input member 12 of the transmission 11. An example of a transient torque damper of the type recommended for the present usage is disclosed in detail in U.S. Pat. No. 5,009,301 which issued on Apr. 23, 1991, to General Motors Corporation, which is hereby incorporated by reference in its entirety. The transient torque damper may incorporate, or be employed in conjunction with, a torque-transmitting mechanism 20 to permit selective engagement of the engine 14 with the transmission 11, but it should be understood that the torque-transmitting mechanism 20 is not utilized to change, or control, the mode in which the transmission 11 operates.

In the embodiment depicted in FIG. 1 the engine 14 may be a internal combustion engine, such as a spark ignited or compression ignited engine, which is readily adapted to provide its available power output delivered at a constant number of revolutions per minute (RPM). The engine 14 is preferably a four-stroke engine in which there is an intake stroke, compression stroke, expansion stroke, and exhaust stroke. The engine 14 shown in FIG. 1 is an of inline four-cylinder configuration. Those skilled in the art will recognize that other engines with multiple cylinders such as six, eight, ten, or twelve as well as varying configurations such as inline, v-type, or horizontally opposed may be used while remaining within the scope of that which is claimed. In the exemplary embodiment shown in FIG. 1, the engine 14 can—after start-up, and during the majority of its input—operate at a constant speed of approximately 6,000 RPM, as represented by curve 22 of FIG. 3. Although it must be understood that the speed and horsepower output of the engine 14 is not critical to the invention, for the purpose of effecting an absolutely clear understanding of the transmission 11, an available output of about 305 horsepower from engine 14 will be assumed for the description of an exemplary installation. Irrespective of the means by which the engine 14 is connected to the input member 12 of the transmission 11, the input member 12 is connected to a planetary gear set 24 in the transmission 11.

The transmission 11 utilizes three planetary gear sets 24, 26 and 28. The first planetary gear set 24 has an outer gear member 30, which may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear set 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear set 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

In this embodiment, the ring gear/sun gear tooth ratio of the planetary gear set 24 is 65/33; the ring gear/sun gear tooth ratio of the planetary gear set 26 is 65/33; and the ring gear/sun gear tooth ratio of the planetary gear set 28 is 94/34.

While all three planetary gear sets 24, 26 and 28 are "simple" planetary gear sets in their own right, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to a first motor/generator 56.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque-transmitting mechanism 62 which, as will be hereinafter more fully explained, is employed to assist in the selection of the operational modes of the transmission 11.

The carrier 52 of the third planetary gear set 28 is connected directly to the transmission output member 64. When the transmission 11 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque-transmitting mechanism 70. Torque-transmitting mechanism 70, as is also hereinafter explained, is also employed to assist in the selection of the operational modes of the transmission 11. The sleeve shaft 66 is also continuously connected to a second motor/generator 72. All the planetary gear sets 24, 26 and 28 as well as the two motor/generators 56 and 72 are coaxially oriented, about the axially disposed shaft 60. It should be noted that both motor/generators 56 and 72 are of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope—i.e.: the circumferential dimension—of the transmission 11 is minimized.

A torque-transmitting mechanism 73 selectively connects the sun gear 40 with ground (i.e.: with transmission housing 68). A torque-transmitting mechanism 75 is operative as a lock-up clutch, locking planetary gear sets 24, 26, motors 56, 72 and the input to rotate as a group, by selectively connecting the sun gear 40 with the carrier 44. The torque-transmitting mechanisms 62, 70, 73, 75 are all friction clutches.

As was previously herein explained in conjunction with the description of the engine 14, it must similarly be understood that the rotational speed and horsepower output of the first and second motor/generators 56 and 72 are also not critical to the invention, but for the purpose of effecting an absolutely clear understanding of the transmission 11, the motors/generators 56 and 72 have a continuous rating of 30 horsepower and a maximum speed of about 10200 RPM. The continuous power rating is approximately 1/10 that of the engine 14, and the maximum speed is approximately 1.5 times that of the engine 14, although, these depend on the type of engine, final gear schematic and duty cycle.

As should be apparent from the foregoing description, and with particular reference to FIG. 1, the transmission 11 selectively receives power from the engine 14. As will now be explained, the hybrid transmission also receives power from an electric storage device 74. The electric storage device 74 may be one or more batteries. Other electric storage devices that have the ability to store electric power and dispense electric power may be used in place of the batteries without altering the concepts of the present invention. As was explained in conjunction with the description of the engine 14 and the motor/generators 56 and 72, it must similarly be understood that the horsepower output of the electrical storage device 74 is also not critical to the invention, but for the purpose of effecting an absolutely clear understanding of the transmission 11 the electrical storage device 74 has a capacity to supply 75 horsepower will be assumed for description of an exemplary device. The battery pack is sized depending on regenerative requirements, regional issues such as grade and temperature, and propulsion requirements such as emissions, power assist and electric range.

The electric storage device 74 communicates with an electrical control unit (ECU) 76 by transfer conductors 78A and 78B. The ECU 76 communicates with the first motor/generator 56 by transfer conductors 78C and 78D, and the ECU 76 similarly communicates with the second motor/generator 72 by transfer conductors 78E and 78F.

As apparent from the previous paragraph, a particular structural member, component or arrangement may be employed at more than one location. When referring generally to that type of structural member, component or arrangement, a common numerical designation will be employed. However, when one of the structural members, components or arrangements so identified is to be individually identified, it will be referenced by virtue of a letter suffix employed in combination with the numerical designation employed for general identification of that structural member, component or arrangement. Thus, there are at least six transfer conductors which are generally identified by the numeral 78, but the specific, individual transfer conductors are, therefore, identified as 78A, 78B, 78C, 78D, 78E and 78F in the specification and in the figures. This same suffix convention shall be employed throughout the specification.

A drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and/or PTO unit, designated either individually or collectively at 88.

In operation, the operator of the vehicle has three, well-known, primary devices to control the transmission 11. One of the primary control devices is a well known drive range selector (not shown) that directs the ECU 76 to configure the transmission for either the park, reverse, neutral, or forward drive range. The second and third primary control devices constitute an accelerator pedal (not shown) and a brake pedal (also not shown). The information obtained by the ECU 76 from these three primary control sources will hereinafter be referred to as the "operator demand." The ECU 76 also obtains information from both the first and second motor/generators 56 and 72, respectively, the engine 14 and the electric storage device 74. In response to an operator's action, the ECU 76 determines what is required and then manipulates the selectively operated components of the hybrid transmission 11 appropriately to respond to the operator demand.

For example, in the exemplary embodiment shown in FIG. 1, when the operator has selected a forward drive range and manipulates either the accelerator pedal or the brake pedal, the ECU 76 determines if the vehicle should accelerate or decelerate. The ECU 76 also monitors the state of the power sources, and determines the output of the transmission required to effect the desired rate of acceleration or deceleration. Under the command of the ECU 76 the transmission is capable of providing a range of output speeds from slow to fast in order to meet the operator demand.

In order to provide a full explanation as to the operation of a transmission embodying the concepts of the present invention, a description of the operational modes employed to achieve the output power and speeds necessary to meet the operator demand under various operating conditions will be provided with respect to the preferred embodiment. As such, the following description describes the full power operational states of the particular transmission identified by the numeral 11.

To reiterate, the transmission 11 is a two-mode, compound-split, electro-mechanical, vehicular transmission. In other words, the output member 64 receives power through two distinct gear trains within the transmission 11. A first mode, or gear train, is selected when the torque-transmitting mechanism 70 is actuated in order to "ground" the outer gear member 46 of the third planetary gear set 28. A second mode, or gear train, is selected when the torque-transmitting mechanism 70 is released and the torque-transmitting mechanism 62 is simultaneously actuated to connect the shaft 60 to the carrier 52 of the third planetary gear set 28.

Those skilled in the art will appreciate that the ECU 76 serves to provide a range of output speeds from relatively slow to relatively fast within each mode of operation. This combination of two modes with a slow to fast output speed range in each mode allows the transmission 11 to propel a vehicle from a stationary condition to highway speeds while satisfying the other objects of the invention. Additionally, the ECU 76 coordinates operation of the transmission 11 so as to allow synchronized shifts between the modes. As noted, operation of the preferred embodiment will be described as it relates to full power operation inasmuch as that approach will fully describe the general operational concepts.

In the following description, it should be noted that the first and second "modes" of operation refer to circumstances in which the transmission functions are controlled by one clutch, clutches 62 or 70, and by the controlled speed and torque of the motor/generators 56 and 72, all as described in U.S. Pat. No. 5,009,301 which was issued on Apr. 23, 1991 to General Motors Corporation. Also, certain "ranges" of operation are described below in which fixed ratios are achieved by applying an additional clutch. This additional clutch may be clutch 62, 73 or 75.

Figure 2:
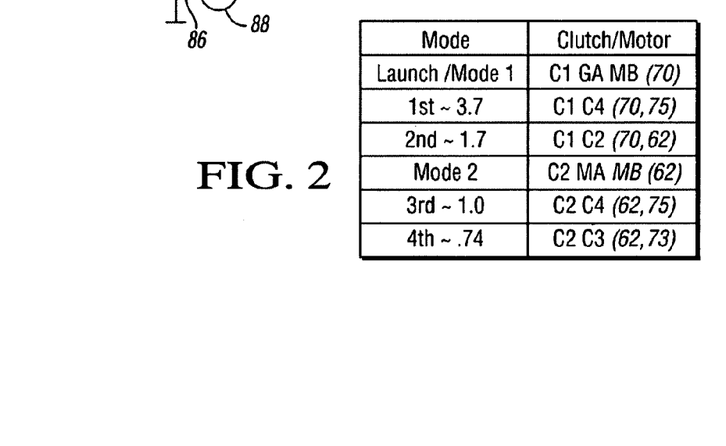
FIG. 2 is a fixed ratio truth table for the transmission shown in FIG. 1.

When the additional clutch is applied, a fixed input to output speed ratio is achieved, as illustrated in the truth table of FIG. 2 (i.e., when two clutching mechanisms are applied). The rotations of the motor/generators 56, 72, will then be dependent on internal rotation of the mechanism as defined by the clutching and proportional to the input speed. The motor/generators, however, still can function as motors or generators, however, they are completely independent of engine to output power flow, thereby enabling both to be motors, both to function as generators, or any combination thereof. This allows, for instance, during acceleration in the first fixed ratio (RANGE I in FIG. 3) that the engine power and both units functioning as motors accepting power from the energy storage device 74 to be additive into propelling the vehicle through planetary gear set 28 to output member 64.

It also should be noted that the function of the transmission 11 can at any time be switched from operation in fixed ratio to mode control by turning the additional clutch on or off during a mode of operation. Determination of operation in fixed ratio or mode control is by algorithms in the ECU 76 controlling the transmission 11.

Figure 3:
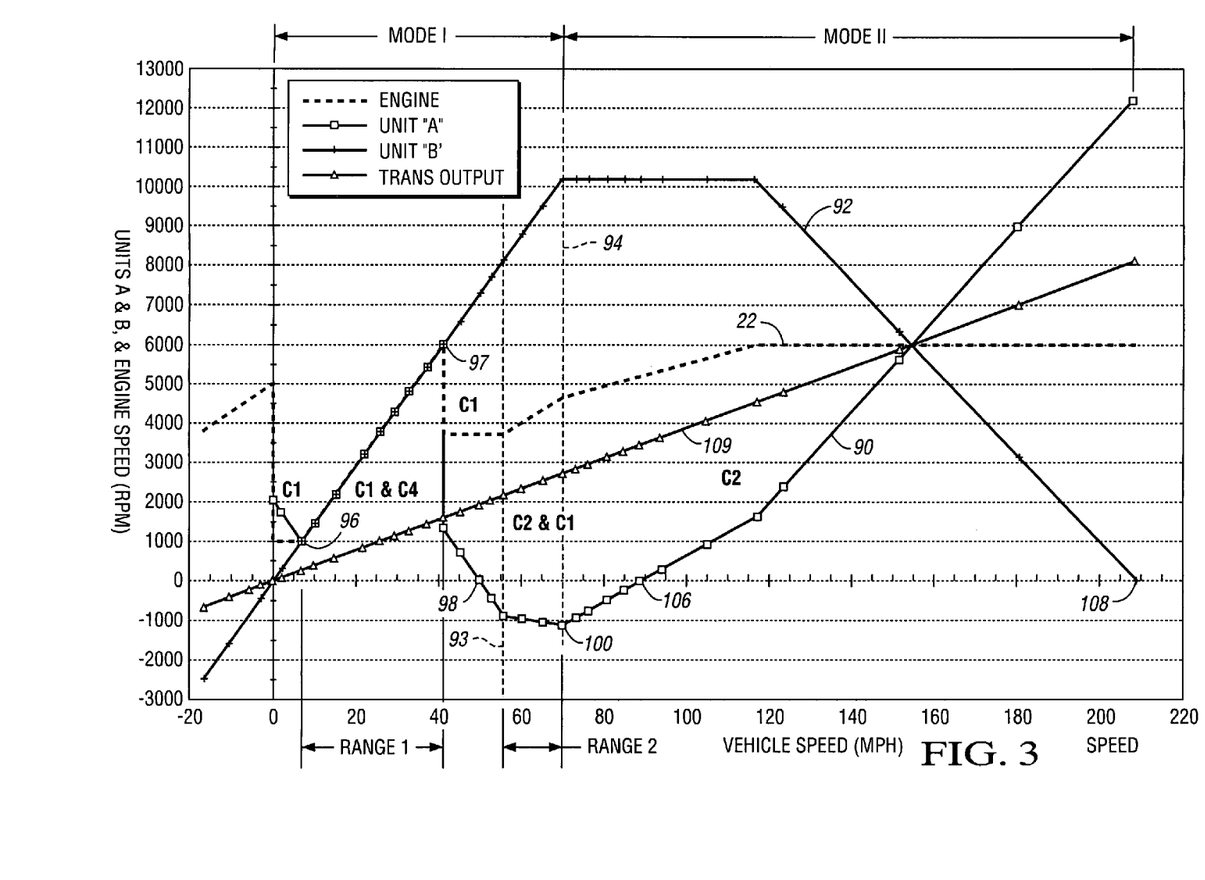
FIG. 3 is a graphical representation of the rotations per minute (RPM) of each motor/generator as well as the engine relative to the speed of the vehicle in miles per hour (MPH).

It also should be noted that the modes of operation may overlap the ratio of operation, and selection depends again on the driver's input and response of the vehicle to that input. As shown in FIG. 3, RANGE 1 falls within mode I operation when C1 and C4 (clutches 70 and 75) are engaged, and RANGE 2 falls within mode I when C2 and C1 (clutches 62 and 70) are engaged. As illustrated in FIG. 2, a third fixed ratio range is available during mode II when C2 and C4 (clutches 62 and 75) are engaged, and a fourth fixed ratio range is available during mode II when C2 and C3 (clutches 62 and 73) are engaged.

In the first mode of operation, and when the ECU 76 has determined that the operator desires to move forwardly from a stationary condition, and to accelerate, the torque-transmitting mechanism 20 is engaged operatively to connect the engine 14 to the transmission 11, and torque-transmitting mechanism 20 remains applied as the vehicle moves forwardly through a speed range hereinafter more fully described. The torque-transmitting mechanism 62 is not applied, and it remains disengaged. The torque-transmitting mechanism 70 is engaged. In this situation, the engine 14 applies driving power to the outer gear member 30 of the first planetary gear set 24 so the outer member 30 rotates in unison with the input member 12 (and thus the engine 14). The first motor/generator 56 simultaneously rotates the inner gear member 32 of the first planetary gear set 24 and the outer gear member 38 of the second planetary gear set 26 in the same direction, thus driving the carrier 36 in the same direction—which effects rotation of the inner gear member 40 of the second planetary gear set 24.

The second motor/generator 72 operates as a motor during the first mode, and as such motor/generator 72 drives sleeve shaft 66 in that direction which rotates the inner gear member 48 of the third planetary gear set 28 to rotate the planet gears 50 of the third planetary gear set 28 against the outer gear member 46 of the third planetary gear set 28. The outer gear member 46 is fixed by having been grounded so that the carrier 52 drives the output member 64 in that direction required to effect forward movement of the vehicle.

That rotation of the sleeve shaft 66 effected by rotation of the second motor/generator 72 operating as a motor also rotates the inner gear member 40 of the second planetary gear set 26. Because the torque-transmitting mechanism 62 remains disengaged, the carriers 36 and 44 of the first and second planetary gear sets 24 and 26, respectively, are freely rotatable—but only in unison inasmuch as the two carriers 36 and 44 are compounded. As a result, the rotation of the outer gear member 30 of the first planetary gear set 24 effected by the engine 14 and the rotation of the inner gear member 40 effected by the second motor/generator 72 force the inner gear member 32 of the first planetary gear set 24 and the conjoined outer gear member 38 of the second planetary gear set 26 to drive the first motor/generator 56 in that direction, and velocity, which causes the first motor/generator 56, at least initially, to serve as a generator.

With reference to FIG. 3, curve 22 is the plot of the engine speed in revolutions per minute (RPM) against the speed in miles per hour (MPH) of the vehicle in which the engine 14 and transmission 11 are incorporated. For convenience, it will be noted that curve 22 is uninterrupted by visual plot points. Curve 90 is the plot of the rotational speed (RPM) of the first motor/generator 56 (Unit A), also relative to the speed (MPH) of the vehicle. This curve may be readily distinguished by the fact that the plot points appear as small squares. Curve 92 is the plot of the rotational speed (RPM) of the second motor/generator 72 (Unit B) relative to the speed (MPH) of the vehicle. This curve may be readily distinguished by the fact that the plot points appear as small plus (+) signs.

Ignoring the fixed ratio operations for this part of the description, the first operational mode of transmission 11 extends from the abscissa, which designates engine speed (RPM), to line 94 which is drawn parallel to the abscissa and which defines the shift from operation of the transmission 11 in the first mode to the second mode. In the representative embodiment described, the first mode extends from the vehicle at rest to a forward speed on the order of about 70 MPH. At speeds greater than about 70 MPH the transmission operates in the second mode. Those skilled in the art will appreciate that this speed may be varied through the selection of alternate gear ratios during the design of the transmission 11

As previously noted, the second motor/generator operates as a motor through the entire first mode—i.e.: from zero to about 70 MPH.

Unique to this invention is that the fixed ratios can be selected, overlapping the operation of the modes, to further improve acceleration by increasing the power reaching the output 64.

In this invention, both ratios and modes are used to improve performance or efficiency. The operation up to line 94 in FIG. 3 (approximately 70 MPH), occurs as follows: Starting in mode I, the first motor/generator 56, however, operates as a generator until approximately 70 MPH—represented by plot point 96 on curve 90. At about 7 MPH, the lock-up clutch 75 is engaged while the clutch 70 remains engaged. In this configuration, the transmission 11 is engaged in the first fixed ratio as defined by the planetary gear set 28, as illustrated in the fixed ratio table of FIG. 2. When the clutch 75 is engaged, the first two gear sets 24, 26 and motor/generators 56, 72 rotate at the input speed, and are connected with the sun gear 48, and with the clutch 70 also engaged there is a speed reduction provided by planetary gear set 28 and torque is multiplied. All power is transmitted mechanically through the planetary gear sets. With no torque present in the motors/generators 56, 72, there are no electrical losses, thus providing a higher efficiency operation, however, with full torque applied in motor/generators 56, 72, a significant increase in performance can be realized. With both motors locked together by device 75, they also can share equally any regenerative power, thereby resulting in higher braking performance with improved cooling. Only the planetary gear set 28 is active because the torque transmitting device, (lock-up clutch) 75 locks up the planetary gear sets 24 and 26. Engagement of the torque transmitting device also protects the motors/generators 56, 72 if the power flow necessary for power split operation is more than the motors/generators would tolerate. Therefore, if the vehicle is towing or hauling up a hill, then the motors/generators are protected.

In normal operation, only the clutch 70 would be engaged at low speeds, but if maximum power is demanded, then the lock-up clutch 75 is also engaged. The motors 56, 72 may be turned on with the clutch 75 to achieve maximum available horsepower, and the motors/generators' 56, 72 power may be reduced to reduce operating temperatures. This clutch also provides the ability for the engine 14 and both motor/generators 56, 72, to all three simultaneously propel the vehicle for maximum acceleration.

Returning to FIG. 3, at plot point 97 the lock-up clutch 75 is disengaged. Thereafter, the motor/generator 72 acts as a motor, and the motor/generator 56 acts as a generator up to the mechanical point 98 wherein the motor/generator 56 is stationary. The motor/generator 56 then reverses direction and acts as a motor.

The clutch 62 is then engaged at about 57 MPH, which corresponds with vertical line 93 of FIG. 3. With the clutches 62 and 70 engaged, a second fixed ratio is achieved. All three gear sets 24, 26, 28 are active, and the ratio is 1.7:1, as indicated in the fixed ratio table of FIG. 2. The motors/generators 56, 72 may be turned off during the engagement of the clutches 62 and 70 for fully mechanical operation. During the second fixed ratio, the motors 56, 72 may freewheel and no torque is present. The first mode ends at line 94 of FIG. 3 when the clutch 70 is turned off and the clutch 62 remains engaged for the high-efficiency second mode of operation.

In the above description, the transmission mode I as described in U.S. Pat. No. 5,009,031, is supplemented with the ability to launch in mode I, shift to fixed ratio 1, return to mode I, and then to fixed ratio 2. The actual operation in the vehicle is determined by inputs to the ECU 76. The transmission may be operated in only mode I, or any combination as necessary to improve efficiency, performance, or braking power up to line 94 of FIG. 3.

Should one wish to duplicate the results described herein, the outer gear members 30 and 38 in each of the first and second planetary gear sets 24 and 26 have 65 teeth, and the inner gear members 32 and 40 in each of the first and second planetary gear sets 24 and 26 have 33 teeth. The outer gear member 46 of the third planetary gear set 28 has 94 teeth, and the inner gear member 48 of the third planetary gear set 28 has 34 teeth. With the configuration of the transmission 10 heretofore described, and with the aforesaid number of teeth on the inner and outer gear members, the transmission provides a mechanical point (98) while operating in the first mode. That is, the first motor/generator 56 has a zero rotational speed at about 50 MPH, as depicted by plot point 98 on curve 90. To complete the description as to the operation of the motor/generators in the exemplary environment described, one must consider operation of the transmission in the second mode of operation.

The transition from the first to the second mode of operation is achieved by disengaging torque-transmitting mechanism 70 and continuing the application of torque-transmitting mechanism 62. Similar to the previously described mode I overlap with fixed ratios, mode II overlaps fixed ratios in the truth table of FIG. 2, as determined by internal and engine speed limitations. At the inception of the second mode of operation, the first motor/generator 56 transitions from operating as a motor to operating as a generator, however this is influenced by the planetary gear ratio selections. Inasmuch as the transition from operation of the transmission 11 in the first mode to operation in the second mode occurs at line 94, the transition of the first motor/generator 56 from a motor to a generator occurs at point 100 on curve 90, which also delineates the intersection of the curve 92 with line 94. The first motor/generator 56 continues to operate as a generator during operation of the transmission 11 in the second mode while the vehicle gains speed from about 70 MPH to about 88 MPH. At about 88 MPH the first motor/generator 56 transitions from operation as a generator back to operation as a motor as it transitions through the mechanical point 106 wherein the motor/generator 56 has zero rotational speed. The first motor/generator 56 continues thereafter to operate as a motor.

At the beginning of the second mode of operation, the second motor/generator 72 continues to operate as a motor. In fact, the second motor/generator 72 operates as a motor until the vehicle reaches a speed of about 88 MPH, at which point it transitions to operation as a generator, and continues thereafter to operate as a generator.

With the configuration of the transmission 11 heretofore described, and with the aforesaid number of teeth on the inner and outer gear members, the transmission 11 provides two mechanical points while operating in the second mode. That is, the first motor/generator 56 has a zero rotational speed at about 88 MPH, as designated by point 106 on curve 90. In addition, the second motor/generator 72 has a zero rotational speed at about 208 MPH, as designated by point 108 on curve 92. Hence, the transmission 11 provides two mechanical points in the second mode of operation.

As illustrated in the fixed ratio table of FIG. 2, third and fourth fixed ratios are available during the second mode. The third fixed ratio may be established with the simultaneous engagement of the clutches 62 and 75, which locks all gear sets into a 1:1 ratio so that the output 64 rotates at the same speed as the input shaft 12.

The fourth fixed ratio is established with the engagement of the clutches 62 and 73 to provide a fixed overdrive ratio of 0.74:1, as illustrated in the fixed ratio table of FIG. 2. In the fourth fixed ratio, the first and second planetary gear sets 24 and 26 are active, and the motors/generators 56, 72 may freewheel with no torque present.

Accordingly, the transmission 11 of the invention provides three mechanical points and four available fixed ratios, thereby minimizing electrical losses in the motors/generators while providing maximum power quickly in the first mode via the lock-up clutch 75.

It should be understood that the exact location of the aforesaid mechanical points is determined not only by the number of teeth on the inner and outer gear members of the planetary gear sets, but also by the rotational speed of the input shaft 12. Hence, with the number of teeth disclosed for the inner and outer gear members in the exemplary embodiment, an increase in the speed of the input shaft 12 will shift the locations of the mechanical points to higher vehicular speeds, and conversely, a reduction in the speed of the input member 12 will shift the mechanical points to lower vehicular speeds.

The C4 clutch 75 shown schematically between the planet carrier 44 and the sun gear 40 may also be located to connect the ring gear 38 and the sun gear 40, and will provide the same lockup function. The C3 brake, 73, however, must remain as shown to brake rotation of sleeve shaft 66.

The reverse mode of operation is effected by having the ECU 76 operate the second motor/generator 72 as a motor, but reversing its rotational direction from the direction in which the second motor/generator 72 rotates when the vehicle begins to move forwardly from a stationary position in the first mode of operation.

The transmission 11 of the present invention provides an adaptation of a two-mode, compound-split, electromechanical transmission which is particularly useful in personal trucks, wherein the typical load is less than half of maximum capacity. The novel transmission uses a lock-up clutch and provides four available mechanical points. It enables maximum power to be reached more quickly for towing and hauling, and enables the use of smaller electrical components which may be cost-effectively implemented into personal trucks. By providing fixed ratios in an electrically variable transmission, maximum fuel economy is achieved at a reasonable cost.

The transmission 11 also provides a single mechanical point during operation in the first mode and two mechanical points during operation in the second mode. As represented by curve 109 of FIG. 3, the transmission 11 provides a continuously increasing output speed throughout its entire operational range. The foregoing transmission 11 employs three planetary gear sets to provide the two-mode operation when operatively controlled by four torque-transmitting mechanisms. Moreover, the three planetary gear sets 24, 26 and 28 as well as both motor/generators 56 and 72 are coaxially disposed with the annular motor/generators 56 and 72 circumscribing the three planetary gear sets 24, 26 and 28 in order to minimize the required envelope, i.e. the circumferential dimension of the transmission 11.

Returning to FIG. 1, the structure and operation of the engine 14 will be discussed in greater detail. The engine 14 includes a rotatable crankshaft 112, a plurality of cylinders 114A-D formed in an engine block 116, and a plurality of selectively activatable and deactivatable poppet valves, namely intake valves 118A-D and exhaust valves 120A-D. The engine also includes a plurality of pistons 122A-D, each being translatable within a respective one of the plurality of cylinders 1 14A-D.

Each of the intake valves 118A-D is movable between an open position in which a gas (e.g., air 124) may be drawn into a corresponding cylinder 114A-D during each intake stroke of the corresponding piston 122A-D, and a closed position to prevent gas from being drawn into the corresponding cylinder 114A-D. Each exhaust valve 120A-D is movable between an open position in which exhaust gas or products of combustion 126 can be exhausted from a corresponding cylinder 114A-D during each exhaust stroke of the corresponding piston 122A-D, and a closed position to prevent gas from being exhausted from the corresponding cylinder 114A-D.

Each cylinder 114A-D in the engine 14 is characterized by an operative condition in which the corresponding valves 118A-D, 120A-D are activated, and an inoperative condition in which the corresponding valves 118A-D, 120A-D are deactivated.

More specifically, each of the intake valves 118A-D is spring-biased in the closed position, and includes a respective valve actuation mechanism 128 such as a rocker arm actuated by an intake camshaft 130 through a selectively collapsible lifter. When an intake valve is activated, the valve actuation mechanism 128 causes the intake valve 118A-D to open during each intake stroke of its corresponding piston 122A-D to admit air into the corresponding cylinder 114A-D from the atmosphere via an intake manifold 132. Thus, when an intake valve 118A-D is activated, it opens and closes once during every two rotations (720 degrees) of the crankshaft 112. When an intake valve 118A-D is deactivated, it remains closed irrespective of crankshaft rotation.

Similarly, each of the exhaust valves 120A-D is spring-biased in the closed position, and includes a respective valve actuation mechanism 128 such as a rocker arm actuated by an exhaust camshaft 134 through a selectively collapsible lifter. When an exhaust valve is activated, the valve actuation mechanism 128 causes the exhaust valve 120A-D to open during each exhaust stroke of its corresponding piston 122A-D to expel exhaust gas 126 from the corresponding cylinder 114A-D to the atmosphere via an exhaust manifold 135. Thus, when an exhaust valve 120A-D is activated, it opens and closes once during every two rotations (720 degrees) of the crankshaft 112. When an exhaust valve 120A-D is deactivated, it remains closed irrespective of crankshaft rotation.

Those skilled in the art will recognize multiple techniques and valvetrain configurations that may be employed to achieve selective deactivation of the valves 118A-D, 120A-D. Exemplary selective valve deactivation systems are described in U.S. Pat. No. 6,557,518, issued May 6, 2003 to Albertson et al; U.S. Pat. No. 6,584,942, issued Jul. 1, 2003 to Albertson et al; U.S. Pat. No. 6,584,951, issued Jul. 1, 2003 to Patel et al; and U.S. Pat. No. 6,637,387, issued Oct. 28, 2003 to Gecim et al, each of which is hereby incorporated in its entirety.

The intake camshaft 130 of the engine 14 has a profile that enables late intake valve closure, or LIVC. A LIVC method of operation allows the intake valves 118A-D, of the respective cylinder 114A-D, to remain open for a predetermined amount of time after bottom dead center of the intake stroke and a portion of the compression stroke of the respective piston 122A-D. The respective intake valve 118A-D will stay open for a portion of the compression stroke of each of the respective cylinders 114A-D thereby allowing a portion of the intake air charge to be pushed back into the intake manifold 132 by the piston 122A-D at low engine speeds. Since the cylinder 114A-D is not completely filled, a higher static or geometric compression ratio when compared to engines employing a convention intake valve timing strategy may be incorporated into the engine 14. The incomplete filling of the cylinders 114A-D at low engine speed may result in a drop in torque which may be offset by the transmission 11 by allowing the motor/generator 56 to "spin down" as the engine 14 "spins up" from an idle operating state.

At higher engine speeds, the LIVC will increase the peak efficiency of the engine 14 by increasing the dynamic compression ratio. The dynamic compression ratio is the effective compression ratio of the engine 14 at speed. At high engine speeds, the gas 124 is entering the cylinders 114A-D at a high velocity and as such has a high inertia. The high inertia of the gas 124 will allow continued filling of the cylinder 114A-D into the compression stroke of the engine 14. Ideally, the intake valve 118A-D will close just prior to the reversal of the gas 126. That is, the point in the compression stroke when the gas 126 stops moving into the cylinder 114A-D and reverts into the intake manifold 132. The high speed volumetric efficiency of the engine 14 is therefore increased using a LIVC operating strategy.

A fuel injection system 136 receives fuel, such as gasoline, from a pressurized fuel source 138. The fuel injection system 136 operates to inject a predetermined amount of fuel at a specific time into the intake manifold 132 for subsequent delivery to one of the cylinders 114A-D. Those skilled in the art will recognize that the fuel injection system 136 may be configured to inject a predetermined amount of fuel directly into the cylinders 114A-D, such as in a diesel compression ignited engine of a direct injection spark ignited engine.

An accessory 137 such as a power steering pump or air conditioning compressor is rotatably connected to the crankshaft 112 via a belt drive 139 disposed on the opposite side of the engine block 116 from the transmission 11. An electronic control module, or ECU 140, is operatively connected to the engine 14 to control each valve actuation mechanisms 128 to individually control each of the valves 118A-D, 120A-D; i.e., the ECU 140 is configured to selectively activate and deactivate each of the valves 118A-D, 120A-D. The ECU 140 is configured to operate the engine 14 in a first state of operation wherein the ECU 140 controls all valves 118A-D, 120A-D such that each intake valve 118A-D is activated and opens during an intake stroke of the corresponding piston 122A-D, and each exhaust valve is activated and opens during an exhaust stroke of the corresponding piston 122A-D during crankshaft rotation. Additionally, the ECU 140 commands the fuel injection system 136 to provide fuel to each of the cylinders 114A-D to enable combustion therein.

The ECU 140 is also configured to operate the engine 14 in a second state of operation wherein all valves 118A-D, 120A-D are deactivated such that each intake valve 118A-D and each exhaust valve 120A-D remains closed irrespective of crankshaft rotation to prevent any cylinder 114A-D from drawing gas therein or from exhausting gas therefrom. Accordingly, the crankshaft 112 may rotate in the second state of operation with no pumping action of the engine 14; i.e., no air 124 is drawn into the intake manifold 132 and cylinders 114A-D, and no exhaust gas 126 is pumped from the cylinders 114A-D and the exhaust manifold 135 into the atmosphere. In the second operating state, the ECU 140 commands the fuel injection system 136 disallow fuel to the cylinders 114A-D. This second state of operation is especially suited to operating conditions when the transmission 11 is operating in an electrical state, i.e. the motor/generator units 56 and 72 are selectively powered by the electric storage device and the transmission 11 receives little or no torque input from the engine 14.

Traditionally, the engine 14 would remain firing or operational during the purely electric operating state of the transmission in order to provide drive to the accessories, such as accessory 137. By deactivating each cylinder 114A-D of the engine 14, the transmission 11 operates to provide the driving force to accessories 137 via the crankshaft 112. In this second state of operation, the pumping losses are small, such that the transmission 11 can efficiently drive the crankshaft 112. Additionally, the second state of operation may act a governor to ensure that the speed of the engine 14 does not spin above a maximum value. Should starting the engine 14 be desired while operating in the second state, the ECU 140 can command the reactivation of the cylinders 114A-D as well as commanding the fuel injection system 136 to provide fuel to the cylinders 114A-D while the crankshaft 112 is rotating.

The ECU 140 is also configured to operate the engine 14 in a third state of operation wherein the valves for at least half of the cylinders are deactivated, and the valves for the remaining cylinders are activated. For example, in a preferred embodiment, the ECU 140 causes the valves 118A, 120A for a first cylinder 114A and the valves 118D, 120D for a second cylinder 114D to be activated so that the first and second cylinders 114A and 114D are operative. While, the ECU 140 causes the valves 118B-C, 120B-C to be deactivated so that cylinders 114B-C are inoperative. Additionally, the ECU 140 will command the fuel injection system 136 to provide fuel to only the operative cylinders 114A and 114D. In such a situation, cylinders 114A and 114 D will continue operating and producing power, while the other cylinders 114B-C will neither draw air in nor exhaust gas out, thereby minimizing pumping losses of the engine. Preferably, every other cylinder in the firing sequence is disabled. For example, a firing sequence or order for a typical four-cylinder engine 14, such as that shown in FIG. 1, will fire the cylinders in the order of 114A, 114C, 114D, and finally 114B. Therefore, to maintain proper balance of the engine 14, cylinders 114C and 114B or 114A and 114D should be rendered inoperable. The third state of operation is especially suited to low load operating conditions where a large torque output from the engine 14 is not required.

By combining an electrically variable transmission with an engine having cylinder deactivation and LIVC, increases in operating efficiencies can be achieved. Furthermore, the transmission 11 allows a greater range for the third state of engine operation by allowing the speed ratio of the transmission 11 to change smoothly as far as is necessary to enable the third state of operation. Furthermore, LIVC provides increased peak efficiency. The third state of operation of the engine 14 provides two different modes of operation, such that the synergistic relationship between LIVC and the third state of operation allows the increased peak efficiency to be obtained at one point with all cylinders activated and another peak efficiency point with half of the cylinders deactivated. The transmission 11 maintains the operating point of the engine 14 near one of these peak efficiency points and provides smooth transitions from one point to another.

While the best mode for carrying out the invention has been described in detail, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

The invention claimed is:

1. A hybrid powertrain comprising:
   a transmission having at least one motor and at least one differential gear set contained therein, said at least one motor and said at least one differential gear set being selectively operable to operate said transmission in an electrically variable mode of operation;
   an internal combustion engine having a plurality of cylinders each of which has at least one intake valve and at least one exhaust valve provided in relation thereto;
   a corresponding plurality of pistons each being reciprocally disposed within a respective one of said plurality of cylinders, said plurality of pistons each having an intake stroke, compression stroke, expansion stroke, and exhaust stroke;
   wherein an intake charge is drawn into each of said plurality of cylinders by a respective one of said plurality of pistons during said intake stroke of said respective one of said plurality of pistons;
   wherein said at least one intake valve and said at least one exhaust valve corresponding to at least half of said plurality of cylinders are selectively deactivatable;
   at least one valve actuation mechanism operable to selectively open and close a respective one of said at least one intake valve; and
   wherein said at least one valve actuation mechanism operates to hold said at least one intake valve of each of said plurality of cylinders substantially open during a substantial portion of said compression stroke thereby operating said internal combustion engine in a late intake valve closing mode of operation when said engine is providing power to a drive member through said transmission.

2. The hybrid powertrain of claim 1, further comprising:
   an accessory;
   wherein said internal combustion engine further includes a crankshaft, said crankshaft being connected to an input shaft of said transmission; and
   wherein said accessory is operatively connected to said crankshaft such that said accessory is driven by said engine via said crankshaft when said engine provides torque to said transmission and is driven by said transmission via said crankshaft when said engine is not providing torque to said transmission.

3. The hybrid powertrain of claim 2, wherein said at least one intake valve and said at least one exhaust valve corresponding to each of said plurality of cylinders are selectively deactivatable such that said at least one motor of said transmission operates to turn said crankshaft and drive said accessory with a minimum of pumping losses.

4. The hybrid powertrain of claim 1, further comprising:
   an electrical storage device operable to selectively provide power to said at least one motor.

5. The hybrid powertrain of claim 1, wherein said transmission and said internal combustion engine are controlled by at least one pre-programmable electronic control unit.

6. The hybrid powertrain of claim 1, further comprising:
   at least one torque transmitting device;
   wherein each of said at least one torque transmitting device is operable to selectively lock a respective one of said at least one differential gear set to enable at least one fixed ratio within said transmission.

7. A hybrid powertrain comprising:
   a transmission having a first and second motor/generator unit contained therein, at least one of said first and second motor/generator units being operable to selectively engage at least one differential gear set to effect a continuously variable mode of operation;
   an internal combustion engine having a plurality of cylinders each of which have at least one intake valve and at least one exhaust valve provided in relation thereto;
   a corresponding plurality of pistons each being reciprocally disposed within a respective one of said plurality of cylinders, said plurality of pistons each having an intake stroke, compression stroke, expansion stroke, and exhaust stroke;
   wherein said at least one intake valve and said at least one exhaust valve corresponding to at least half of said plurality of cylinders are selectively deactivatable;
   at least one valve actuation mechanism operable to selectively open and close a respective one of said at least one intake valve; and
   wherein said at least one valve actuation mechanism operates to hold said at least one intake valve of each of said plurality of cylinders substantially open during a substantial portion of said compression stroke thereby operating said internal combustion engine in a late intake valve closing mode of operation when said engine is providing power to a drive member through said transmission.

8. The hybrid powertrain of claim 7, further comprising:
   an accessory;
   wherein said internal combustion engine further includes a crankshaft, said crankshaft being connected to an input shaft of said transmission; and
   wherein said accessory is operatively connected to said crankshaft such that said accessory is driven by said engine via said crankshaft when said engine provides torque to said transmission and is driven by said transmission via said crankshaft when said engine is not providing torque to said transmission.

9. The hybrid powertrain of claim 8, wherein said at least one intake valve and said at least one exhaust valve corresponding to each of said plurality of cylinders are selectively deactivatable such that at least one of said first and second motor/generator units of said transmission operates to substantially turn said crankshaft and drive said accessory with a minimum of pumping losses.

10. The hybrid powertrain of claim 7, further comprising:
an electrical storage device operable to selectively provide power to said each of said first and second motor/generator units; and
wherein said electrical storage device is operable to selectively receive power from each of said first and second motor/generator units.

11. The hybrid powertrain of claim 7, wherein said transmission and said internal combustion engine are controlled by at least one pre-programmable electronic control unit.

12. A hybrid powertrain comprising:
a transmission having an input member, an output member, and first and second motor/generator units;
an energy storage device for interchanging electrical power with said first and second motor/generator units;
an electronic control unit for regulating the electrical power interchange between said energy storage device and said first and second motor/generators and also for regulating electrical power interchange between said first and second motor/generator units;
wherein said transmission includes three planetary gear sets each having first, second and third members;
one of said members of said planetary gear sets being connected to said first motor generator unit, and another of said members of said planetary gears sets being connected to said second motor/generator unit;
wherein said transmission includes four torque-transmitting mechanisms selectively connecting members of said planetary gear sets with other members of said planetary gear sets and with ground, one of said torque-transmitting mechanisms being operative as a lock-up clutch to lock two of said planetary gear sets into a 1:1 ratio;
first and second interconnecting members continuously connecting members of said planetary gear sets;
said four torque-transmitting mechanisms being selectively engageable in pairs to provide four fixed ratios between the input member and the output member when no torque is present in said first and second motor/generator units;
an internal combustion engine connected with said input member of said transmission;
said internal combustion engine having a plurality of cylinders each of which have at least one intake valve and at least one exhaust valve provided in relation thereto;
a corresponding plurality of pistons each being reciprocally disposed within a respective one of said plurality of cylinders;
at least one valve actuation mechanism operable to selectively open and close a respective one of said at least one intake valve; and
wherein said at least one valve actuation mechanism operates to hold said at least one intake valve of each of said plurality of cylinders substantially open during a substantial portion of said compression stroke thereby operating said internal combustion engine in a late intake valve closing mode of operation when said engine is providing power to a drive member through said transmission.

13. The hybrid powertrain of claim 12, wherein said plurality of pistons each has an intake stroke, compression stroke, expansion stroke, and exhaust stroke and wherein said at least one intake valve of each of said plurality of cylinders remains substantially open during a portion of said compression stroke.

14. The hybrid powertrain of claim 12, further comprising:
an accessory;
wherein said internal combustion engine further includes a crankshaft, said crankshaft being connected to said input member of said transmission; and
wherein said accessory is operatively connected to said crankshaft such that said accessory is driven by said engine via said crankshaft when said engine provides torque to said transmission and is driven by said transmission via said crankshaft when said engine is not providing torque to said transmission.

15. The hybrid powertrain of claim 12, wherein said at least one intake valve and said at least one exhaust valve corresponding to each of said plurality of cylinders are selectively deactivatable such that at least one of said first and second motor/generator units of said transmission operates to substantially turn said crankshaft and drive said accessory with a minimum of pumping losses.

* * * * *